United States Patent
Mayer et al.

(10) Patent No.: US 7,519,861 B2
(45) Date of Patent: Apr. 14, 2009

(54) METHOD AND SYSTEM FOR REMOTELY DIAGNOSING DEVICES

(75) Inventors: Matthias Mayer, Stuttgart (DE); Ulrich Clanget, St. Ingbert (DE)

(73) Assignee: Sony Deutschland GmbH, Cologne (DE)

( * ) Notice: Subject to any disclaimer, the term of this patent is extended or adjusted under 35 U.S.C. 154(b) by 311 days.

(21) Appl. No.: 10/910,535

(22) Filed: Aug. 3, 2004

(65) Prior Publication Data
US 2005/0034019 A1 Feb. 10, 2005

(30) Foreign Application Priority Data
Aug. 4, 2003 (EP) ................... 03017793

(51) Int. Cl.
*G06F 11/00* (2006.01)
(52) U.S. Cl. .......................... 714/28; 714/27
(58) Field of Classification Search ............... 714/27, 714/28; 702/188, 183; 713/340
See application file for complete search history.

(56) References Cited

U.S. PATENT DOCUMENTS

| | | | |
|---|---|---|---|
| 5,964,891 A | 10/1999 | Caswell et al. | |
| 6,065,136 A * | 5/2000 | Kuwabara | 714/31 |
| 6,138,249 A | 10/2000 | Nolet | |
| 6,571,356 B1 * | 5/2003 | Mehr et al. | 714/28 |
| 6,826,512 B2 * | 11/2004 | Dara-Abrams et al. | 702/183 |
| 6,904,389 B2 * | 6/2005 | Hornberger et al. | 702/188 |
| 7,020,600 B2 * | 3/2006 | Deao et al. | 703/27 |
| 2002/0035447 A1 * | 3/2002 | Takahashi et al. | 702/188 |
| 2003/0237023 A1 * | 12/2003 | Saloh et al. | 714/28 |

FOREIGN PATENT DOCUMENTS

EP 1 316 886 6/2003

* cited by examiner

*Primary Examiner*—Gabriel L Chu
(74) *Attorney, Agent, or Firm*—Oblon, Spivak, McClelland, Maier & Neustadt, P.C.

(57) ABSTRACT

A method for diagnosing devices via a remote testing device (2) being connectable to devices to be diagnosed (1) via a communication network (4) is provided. Between the remote testing device (2) and the devices to be diagnosed (1) first diagnostics information is exchanged (S3, S8, S11-S16) to perform said remote diagnosing. The remote diagnosing is done in dependence of second diagnostics information being exchanged between (S6, S7) said remote testing device (2) and controlling devices (3) being connectable to said remote testing device (2) via said communication network (4).

15 Claims, 3 Drawing Sheets

METHOD AND SYSTEM FOR REMOTELY DIAGNOSING DEVICES

The present invention relates to a method, a remote testing device and a system for remotely diagnosing devices.

Remote device diagnosis is a well-known technology and bases upon the following principle: a remote testing device sends test commands to a device to be tested (DUT) in order to initiate the execution of self test routines within the DUT. Test result data is sent back from the DUT to the remote testing device which analyses said data in order to detect possible defects of the DUT. Remote device diagnosis frees a customer of the DUT from sending the DUT to a service centre if technical problems occur during the use of the device. Thus, this technology shows a very high potential for saving costs.

It is an object of the present invention to provide a method/system for remotely diagnosing devices which is easy to handle and which shows a high standard of security.

To solve this object, the present invention provides a method for diagnosing devices according to claim 1. To perform this method, the present invention further provides a remote testing device and a device according to claims 10 and 15, respectively. In addition, the present invention provides a system for remotely diagnosing devices according to claim 14. Last, a computer program product and a computer readable storage means according to claim 8 are provided. Further features and preferred embodiments of the present invention are defined in respective subclaims.

According to the present invention, a method for diagnosing devices via a remote testing device being connectable to devices to be diagnosed via a communication network is provided, wherein between the remote testing device and the devices to be diagnosed (also referred to as "devices to be tested") first diagnostics information is exchanged in order to perform the remote diagnosing. The remote diagnosing is done in dependence of second diagnostics information being exchanged between the remote testing device and controlling devices being connectable to the remote testing device via the communication network.

The terms "first/second diagnostics information" include all types of data/functionality which can be used in conjunction with remote diagnosis like remote diagnosis commands, remote diagnosis requests, remote diagnosis result data, diagnosis algorithms to be executed within the devices to be tested or within the remote testing device, registration data of the controlling devices and the devices to be tested, etc.

An important aspect of the present invention is that remote diagnosis procedures being performed between the remote testing device and the devices to be tested are primarily not initiated by the remote testing device itself, but by controlling devices which are connected to the remote testing device via a communication network. Several controlling devices "share" one single remote testing device for performing remote diagnosis tasks. The controlling devices (which are for example located within repair or service centres) do therefore not have to comprise the complete functionality/data being necessary to do remote diagnosis since a large part of this functionality/data can be concentrated within the remote testing device. In this sense, the remote testing device can be regarded as a database/a service accessible via the communication network which can be used for service centres and devices to be tested to perform/request remote diagnosis tasks. All controlling devices being connected to the remote testing device can use this functionality to perform their remote diagnosis tasks. The use of the remote testing device as a centralized server system has several advantages: If, for example, new remote testing procedures for already existing devices/new devices to be tested are available, it should generally only be necessary to update remote testing functionality/data within the remote testing device, i.e. it should not be necessary for the controlling devices to change their way of communication with the remote testing device to perform their diagnosis tasks. That is, "general" remote diagnosis requests sent by the controlling devices to the remote testing device can be parsed within the remote testing device and be "mapped" onto "individual" remote diagnosis procedures which are assigned to the devices to be tested, respectively. If new remote testing functionality/data is available, only the mapping process within the remote testing device has to be changed. In other words, the remote testing device functions like an interface between the controlling device and the devices to be tested which "hides" specific functionality/data being necessary for executing remote diagnosis procedures.

Preferably, each device to be tested is registered at the remote testing device by exchanging first registration information between the device to be tested and the remote testing device. Accordingly, each controlling device is registered at the remote testing device by exchanging second registration information between the controlling device and the remote testing device.

The remote testing device may assign at least one of the registered controlling device to each registered device to be tested, respectively. This assignment process is very useful if a remote diagnosis process has to be initiated by the device to be tested, which will become apparent later.

The remote testing device can also be regarded as diagnostics information "generating" machine which processes received second diagnostics information and generates first diagnostics information in dependence of a processing result of the received second diagnostics information. The first diagnostics information generated may be sent to devices to be tested. Accordingly, the remote testing device may process received first diagnostics information and generate second diagnostics information in dependence of a processing result of the received first diagnostics information, wherein the generated second diagnostics information may be sent to the controlling devices. If for example the controlling device sends a simple command "test device A" to the remote testing device, the remote testing device may analyse which specific remote diagnosis processes are possible/suitable and generate appropriate first diagnostics information for initiating/performing all possible remote diagnosis tasks.

The remote testing device preferably shows firewall means for blocking unauthorized remote access to the devices to be diagnosed, and for blocking undesired second diagnostics information sent from the controlling devices to the remote testing device. In other words, it is desirable that the remote testing device also functions as a firewall between the devices to be diagnosed and the controlling devices. Thus, an abuse of remote diagnosis from the controlling device's side can be prevented. A further measure for preventing an abuse of remote diagnosing is to keep the way of communication between the remote testing device and the controlling devices open, whereas the way of communication between the remote testing device and the devices to be diagnosed is private. In other words: a specification of a communication protocol between the remote testing device and the devices to be diagnosed is kept secret, whereas a specification of a communication protocol between the remote testing device and controlling devices is public.

If the controlling device should already show the whole "knowledge" needed for performing remote diagnosis, the remote testing device could also only forward second diagnostics information received from a controlling device as first diagnostics information to the device to be tested without generating any new first diagnostics information. In this case, the remote testing device should in particular show firewall functionality in order to block unauthorized access to devices to be tested and to block an abuse of remote diagnosis by the controlling devices.

In a preferred embodiment, the remote testing device comprises both firewall functionally for blocking an abuse of remote diagnosis and means for generating new diagnostics information. Thus, a very flexible remote diagnosing system can be realized.

For example, in order to initiate a remote diagnosis process, a device to be diagnosed may send first diagnostics information including a remote diagnosis request to the remote testing device. The remote testing device then generates second diagnostics information including a notification of the remote diagnosis request and sends the generated second diagnostics information to a controlling device which is assigned to the device to be diagnosed. In this way, the controlling device is informed by the remote testing device that a remote diagnosis process has to be executed. In response, the controlling device being informed may send second diagnostics information including ("general") remote diagnosis commands to the remote testing device which generates first diagnostics information including at least one ("device specific") remote diagnosis command. Then, the remote testing device may send the first diagnostics information generated to the devices to be tested, thereby performing the remote diagnosing procedures. Corresponding diagnose results are sent as first diagnostics information from the device to be tested to the remote testing device which generates second diagnostics information including the diagnose results which are sent to the controlling device.

To perform the method described above, the invention provides a remote testing device being connectable to devices to be diagnosed via a communication network. The remote testing device comprises means for sending/receiving first diagnostics information to/from the devices to be diagnosed in order to perform remote diagnosing. The remote testing device further comprises means for sending/receiving second diagnostics information to/from controlling devices being connectable to the remote testing device via the communication network, wherein the remote diagnosing is done in dependence of said second diagnostics information.

Preferably, the remote testing device comprises means allowing a device to be tested and/or a controlling device to register itself at the remote testing device, respectively.

Further, the remote testing device may comprise assigning means for assigning to each registered device to be tested one of said registered controlling devices, respectively.

The remote testing device may also comprise diagnostics information generating means for generating first/second diagnostics information in dependence of received second/first diagnostics information.

The devices to be tested/the controlling devices are devices which are connectable to a remote testing device via a communication network, wherein said devices comprise communication means for sending/receiving diagnostics information to/from the remote testing device. According to the present invention, those devices also show registration means for registering itself at a remote testing device.

The present invention further provides a system for remotely diagnosing devices which comprises a remote testing device according to the present invention, at least one device to be diagnosed according to the present invention, and at least one controlling device according to the present invention, wherein said remote testing device, said at least one device to be diagnosed and said at least one controlling device are connected with each other via the communication network described above. The communication network (or parts thereof) may for example be the Internet. However, any other communication network, for example the telephone network, may be used. It is also possible to use different communication networks like the Internet and the telephone network simultaneously, i.e. the communication network may consist of different communication sub-networks.

The present invention further provides a computer program product comprising computer program means adapted to perform the method steps according to the present invention and/or to embody the system according to the present invention when it is executed on a computer, a digital signal processor or the like. Last, the present invention provides a computer readable storage means which stores a computer program product according to the present invention.

In the following description, the present invention will be explained by way of example while making reference to the accompanying drawings, wherein.

Figure 1:
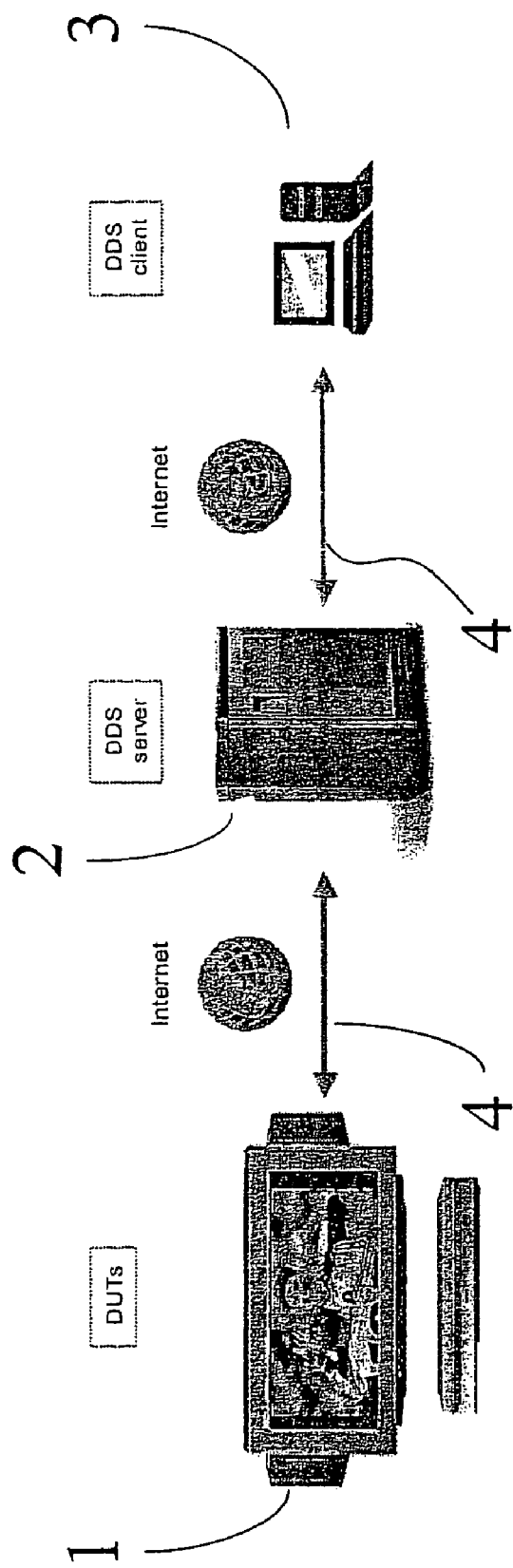
FIG. 1 shows a preferred embodiment of a system for remotely diagnosing devices according to the present invention.

According to FIG. 1, a preferred embodiment of a system according to the present invention shows a device to be tested 1, a remote testing device 2, and a controlling device 3. The device to be tested 1 is linked with the remote testing device 2 via the Internet 4. Accordingly, the remote testing device 2 is linked with the controlling device 3 via the Internet 4. It is possible to replace the links between the remote testing device 2 and the device to be tested 1/the controlling device 3 by any other type of network, respectively. As will become apparent in the following description, all remote diagnosis procedures are managed/coordinated by the remote testing device 2. As a consequence, "thin" (with respect to the amount of remote diagnosis functionality being directly available within the remote testing device) controlling devices 3 are sufficient for performing remote diagnosing tasks, since all functionality needed to perform remote diagnosing is concentrated within one single "fat" server device (remote testing device 2). In the following description, a typical communication process between the device to be tested 1, the remote testing device 2 and the controlling device 3 will be described while making reference to FIGS. 2 and 3.

In a first step S1, the device to be tested 1 registers itself at the remote testing device 2. For example, the device to be tested 1 may pass its serial number together with a name or a customer ID of the customer of the device to be tested 1 to the remote testing device 2. In a second step S2, a similar procedure is done in order to register a controlling device 3 at the remote testing device 2. If the customer of the device to be tested 1 wants a service centre to perform remote diagnosis, in a third step S3, he initiates a remote diagnosis by sending first diagnostics information including a remote diagnosis request to the remote testing device 2. In a fourth step S4, the remote testing device 2 finds out which customer ID is assigned to the device to be tested 1. Then, in a fifth step S5, the remote testing device 2 finds out which controlling device 3 is assigned to the device to be tested 1. The remote testing device 2 then sends second diagnostics information to the assigned controlling device 3 in a sixth step S6 in order to notify the controlling device 3 that remote diagnosis tasks have to be done. A customer of the controlling device 3 or the controlling device 3 itself may then decide which kind of remote diagnosis tasks have to be done. In a seventh step S7, the controlling device 3 sends second diagnostics information to the remote testing device 2. The remote testing device 2 then performs individual remote diagnosis tasks on the basis of the second diagnostics information received in an eighth step S8.

Figure 3:
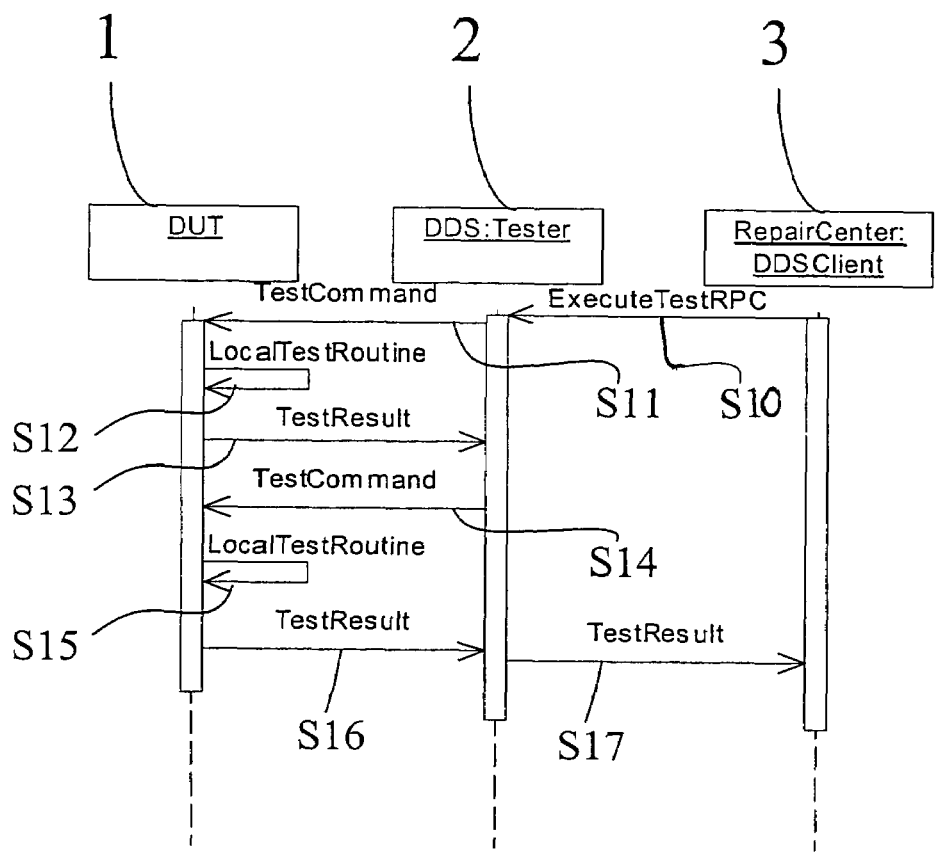
FIG. 3 shows a preferred embodiment of a second part of a communication process between a device to be tested, a remote testing device and a controlling device according to the present invention.

If the controlling device 3 has the full "knowledge" needed to diagnose the device to be tested 1, the controlling device 3 may determine a complete set of diagnostic procedures and send correspond diagnose commands to the remote testing device 2 which just forwards those commands to the device to be tested 1. If, however, the controlling device 3 has not enough knowledge to generate all necessary remote diagnostic commands itself, it may just pass a "general" diagnostic command to the remote testing device 2. This situation is shown in FIG. 3. In a tenth step S10, the controlling device 3 sends a "general" command to the remote testing device 2. The remote testing device 2 then parses the received "general" command and generates several "detailed" commands therefrom which are sent as first diagnostics information in an eleventh step S11 and in an fourteenth step S14 to the device to be tested 1. In response to the test command sent in the eleventh step S11, the device to be tested 1 performs a local test routine in an twelfth step S12 and sends corresponding test results back to the remote testing device 2 in an thirteenth step S13. In response to the test command sent in the fourteenth step S14, the device to be tested 1 performs a local test routine in a fifteenth step S15 and sends corresponding test results in an sixteenth step S16 back to the remote testing device 2. The remote testing device 2 then collects all test results received during the thirteenth and sixteenth step S13, S16 and sends a "common" test result back to the controlling device 3 in an seventeenth step S17.

The invention can also be expressed as follows:

Remote device diagnosis has a very high potential to reduce costs for repair and service centers. First of all this is interesting for the producing company itself, but also independent repair centers could profit from this technology. The present invention is especially valuable in combination with other tools that are already on the market (e.g. product replacement part databases). Remote device diagnosis could enrich theses products considerably.

The present invention considers a centralized system architecture preferably having a Web Service as intermediary which will be referred to as Device Diagnosis Service (DDS).

Remote Diagnosis works as following: A Tester is sending test commands to a device to be tested (also referred to as Device Under Test (DUT)) in order to execute test routines on the DUT and analyses the response that contain the test result in order to detect the defect. This is done remotely via Internet or other telecommunication means and in a point-to-point manner.

The DDS (also referred to as "remote testing device" or "tester") is an intermediary device that is doing remote diagnosis for others. It is responsible for the execution of remote diagnoses, that means sending test commands and receiving the corresponding test responses. Its clients are not communicating directly with the DUT but indirectly over the DDS.

This approach has several advantages. First of all, the client doesn't have to worry about new tests or new devices, since this is handled by the DDS implementer and not by the DDS client implementer. Second, since there is no direct communication between the client (the "outside world") and the DUT there is no risk of abuse of remote diagnoses; the protocol between the DDS and the DUT keeps in private. In addition, all accesses of DDS could be logged, so that all operations could be followed. This gives various possibilities for combination with other services like customer databases, error tracking, but also new business models like DDS per use payment or DDS subscriptions with flat rates are possible.

One of the problems that has to be solved is how the DUT and the DDS "come together". It is the customer that initiates a remote diagnosis session. That's the reason why the DUT preferably contains the Internet address of the tester. The manufacturer of the device has set this address during the production. The tester address is not settable because of two reasons. First, one of the problems of today's consumer electronics devices are the difficulties that users have with finding and adjusting settings and one goals of remote diagnosis is to resolve these problems and not to be a part of it. Second, this prevents abuse of this value by unwanted intruders like Internet hackers.

DDS is the technology that is connecting the DUT and the DDS client that are unknown to each other before the diagnosis starts. Therefore, both have to be registered at the DDS. The DUT is a registered device of the customer who has bought it. This customer registers the device with its serial number together with his name or his customer id. At the same time an independent repair center has to be registered at the manufacturer in order to use DDS.

When the repair center gets the order of the customer to check its device via remote diagnosis it will register the customer at the manufacturer as a client of the repair center.

Figure 2:
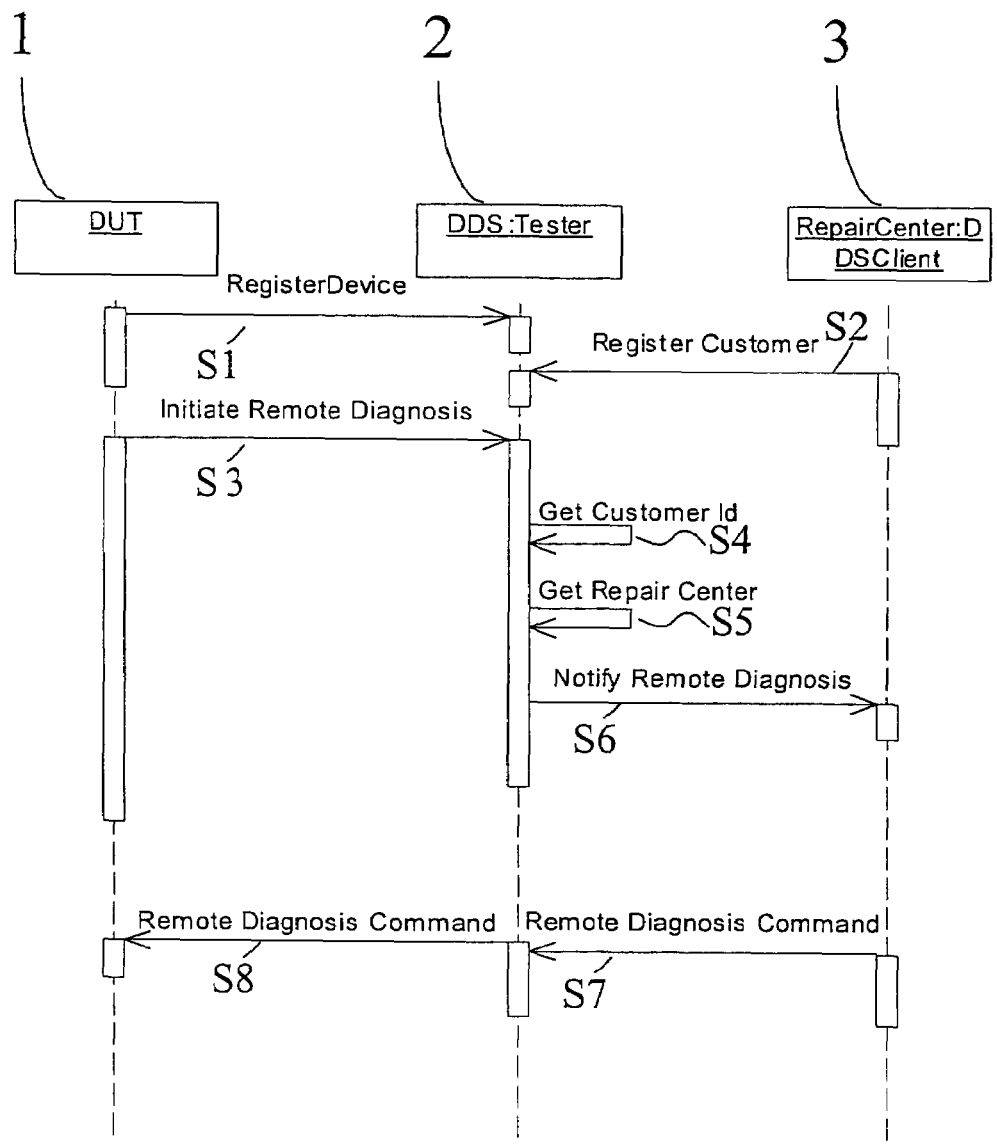
FIG. 2 shows a preferred embodiment of a first part of a communication process between a device to be tested, a remote testing device and a controlling device according to the present invention.

Now the system is ready for remote diagnosis. When the customer initiates the remote diagnosis, an Internet connection is established between DUT and DDS. The DDS, that is the actual tester sets up the remote diagnosis session with the DUT. It first queries the serial number of the DUT. This number is then used to retrieve the customer id from the database where the device is registered. Then the DDS is looking for a repair center that is registered for the customer. It informs this repair center and is now waiting for diagnostic commands that have to be passed to the DUT. This situation is shown in FIG. 2.

As mentioned before, the communication between the repair center (client) and the DUT (server) is not direct. They have to communicate indirectly via the DDS as intermediary. Thus, the client-server communications preferably consists of two parts and two protocols. Part one is the client-DDS communication and part two is the DDS-Server communication. The protocols of both communication parts may not be identical.

This has two reasons. First, different protocols could be used for different types of DUTs because of different "historical" reasons of the product development. But also different versions of this protocol could be in use due to different release times of devices. Second, as a matter of privacy and security, it is advisable to "protect" a DDS-DUT communication protocol from outside use and abuse.

One possibility of a DDS-DUT protocol is NRD (Network Remote Diagnosis) that defines a generic protocol and mechanisms for testing devices via the Internet.

The protocol between DSS and the client is open. This gives the possibility to integrate device diagnostic functionality in a variety of other applications, like a replacing parts database, an ordering system or repair center software. One possible technology that enables the integration of different systems is the Web Service standard including SOAP (Simple Object Access Protocol) and WSDL (Web Services Description Language). SOAP enables the implementation of platform and programming language independent RPCs (Remote Procedure Calls). WSDL provides mechanisms to define and export functionality. Web Services are the technique to integrate different applications (EAI).

FIG. 3 illustrates how the DDS-client-server system works. After the connection setup (section 2) diagnostic tests are executed. This is done in a unidirectional way. The DDS client executes a test command in form of an RPC (Remote Procedure Call). The DDS processes the command by sending one or more test commands to the DUT. The DUT executes local test routines and returns the results to the DDS. The DDS puts the results that belong to the RPC invocation together and returns the procedure result. Since the DDS may maintain multiple diagnostic connections at the same time the RPC needs an identification of the device as a parameter so that the DDS is able to dispatch the test commands to the corresponding DUT. This identifier preferably is the serial number that is unique for each device.

As has become apparent, a preferred embodiment of the present invention describes a centralized system architecture with a web service as intermediary (DDS). Remote diagnosis works as follows: a tester is sending test commands to a DUT in order to execute test routines on the DUT and analyses the response that contains the test results in order to detect possible defects. This is done remotely via Internet or other telecommunication means and in a point to point manner. The DDS-architecture is an intermediary that is doing remote diagnosis for others. It is responsible for the execution of remote diagnosis, that means sending test commands and receiving the corresponding test responses. Its clients are not communicating directly with the DUT, but indirectly over the DDS.

REFERENCE SYMBOLS

1 Device to be tested (diagnosed)
2 Remote testing device
3 Controlling device
4 Communication network
S1-S17 First to seventeenth step

The invention claimed is:

1. A method for diagnosing a device via a remote testing device, comprising:
   remotely diagnosing said device by exchanging first diagnostic information between said remote testing device and said device via a communication network;
   registering a plurality of controlling devices at the remote testing device by exchanging registration information between said controlling devices and said remote testing device;
   assigning at least one of said plurality of controlling devices to said device to make the diagnosis;
   exchanging second diagnostic information between said remote testing device and said assigned at least one controlling device via said communication network; and
   performing said step of remotely diagnosing based on said second diagnostic information.

2. The method according to claim 1, further comprising:
   registering said device to be diagnosed at the remote testing device by exchanging first registration information between said device to be diagnosed and said remote testing device.

3. The method according to claim 1, wherein:
   said remote testing device processes received second diagnostics information and generates first diagnostics information in dependence of a processing result of said received second diagnostics information, and
   said generated first diagnostics information is sent to said devices to be diagnosed.

4. The method according to claim 1, wherein:
   said remote testing device processes received first diagnostics information and generates second diagnostics information in dependence of a processing result of said received first diagnostics information, and
   said generated second diagnostics information is sent to said assigned at least one controlling device.

5. The method according to claim 4, wherein:
   in order to initiate a remote diagnosis process, said device to be diagnosed sends first diagnostics information including a remote diagnosis request to said remote testing device, and
   said remote testing device generates second diagnostics information including a notification of said remote diagnosis request and sends said second diagnostics information to said assigned at least one controlling device assigned to said device to be diagnosed, informing said assigned at least one controlling device that a remote diagnosis process has to be executed.

6. The method according to claim 5, wherein:
   said assigned at least one controlling device being informed sends second diagnostics information including remote diagnosis commands to said remote testing device which generates first diagnostics information including at least one device specific remote diagnosis command and sends said first diagnostics information to said devices to be diagnosed in order to perform remote diagnosing procedures, and
   corresponding diagnostics results are sent as first diagnostics information to said remote testing device which generates second diagnostics information including said diagnostics results which is sent to said assigned at least one controlling device.

7. The method according to claim 1, wherein the manner of communication between the remote testing device and the assigned at least one controlling devices is open, and the manner of communication between the remote testing device and the devices to be diagnosed is private.

8. A computer program stored on a recordable medium for causing a computer to perform the method steps according to claim 1, when the program is executed on the computer or a digital signal processor.

9. A remote testing device connectable to a device to be diagnosed via a communication network, said remote testing device comprising:
   means for exchanging first diagnostics information with said device to be diagnosed;
   means for registering a plurality of controlling devices at the remote testing device by exchanging registration information between the controlling device and the remote testing device;
   means for assigning at least one of the plurality of controlling devices to make a diagnosis;
   means for exchanging second diagnostics information between said assigned at least one controlling device and the remote testing device via the communication network;
   diagnostic information generation means for generating said first diagnostics information based on said second diagnostics information.

10. A remote testing device according to claim 9, further comprising registration means for registering said device to be diagnosed at the remote testing device.

11. A remote testing device according to claim 9, further comprising:

registration means for registering devices to be diagnosed and said controlling devices, wherein, said assigning means assigns to each registered device to be diagnosed at least one of said registered controlling devices, respectively.

12. A remote testing device according to claim 9, further comprising firewall means for blocking unauthorized remote access to the devices to be diagnosed, and for blocking undesired second diagnostics information sent from the controlling devices to the remote testing device.

13. The remote testing device according to claim 9, further comprising:

registration means for registering said controlling devices.

14. A system for remotely diagnosing devices, comprising:

at least one device to be diagnosed; and means for registering a plurality of controlling devices at the remote testing device by exchanging registration information between the controlling device and the remote testing device;

a remote testing device configured to be connected to a device to be diagnosed via a communication network, said remote testing device including means for exchanging first diagnostics information between said device to be diagnosed and the remote testing device;

means for assigning at least one of the plurality of controlling devices to make a diagnosis;

means for exchanging second diagnostic information between said assigned at least one controlling device and the remote testing device via the communication network;

diagnostic information generation means for generating said first diagnostic information based on said second diagnostic information, wherein said remote testing device, said at least one device to be diagnosed and said plurality of controlling devices are connected with each other via a communication network, and said at least one device to be diagnosed and said plurality of controlling devices each comprises communication means for sending/receiving diagnostics information to/from said remote testing device.

15. The system according to claim 14, wherein at least parts of said communication network are constituted by the Internet.

* * * * *